(12) United States Patent
Kamata et al.

(10) Patent No.: US 8,017,023 B2
(45) Date of Patent: *Sep. 13, 2011

(54) METHOD OF MANUFACTURING MAGNETIC RECORDING MEDIUM AND MAGNETIC RECORDING MEDIUM

(75) Inventors: Yoshiyuki Kamata, Tokyo (JP); Kaori Kimura, Kawasaki (JP); Yousuke Isowaki, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/882,113

(22) Filed: Sep. 14, 2010

(65) Prior Publication Data

US 2011/0000880 A1 Jan. 6, 2011

Related U.S. Application Data

(63) Continuation of application No. 12/544,606, filed on Aug. 20, 2009.

(30) Foreign Application Priority Data

Aug. 22, 2008 (JP) .................................. 2008-213674

(51) Int. Cl.
*B44C 1/22* (2006.01)
(52) U.S. Cl. .................. 216/22; 216/44; 216/66; 216/81
(58) Field of Classification Search .................... 216/22, 216/44, 66, 81
See application file for complete search history.

(56) References Cited

U.S. PATENT DOCUMENTS

| 6,014,296 | A | 1/2000 | Ichihara et al. |
| 6,221,519 | B1 | 4/2001 | Doi et al. |
| 6,266,354 | B1 | 7/2001 | Chino et al. |
| 6,984,529 | B2 | 1/2006 | Stojakovic et al. |
| 7,067,207 | B2 | 6/2006 | Kamata et al. |
| 7,100,263 | B2 | 9/2006 | Imada et al. |
| 2001/0055852 | A1 | 12/2001 | Moise et al. |
| 2002/0090827 | A1 | 7/2002 | Yokoshima |
| 2004/0020894 | A1 | 2/2004 | Williams et al. |
| 2004/0253817 | A1 | 12/2004 | Imada et al. |
| 2005/0000934 | A1 | 1/2005 | Nakatani et al. |

(Continued)

FOREIGN PATENT DOCUMENTS

JP 02-207418 8/1990

(Continued)

OTHER PUBLICATIONS

Translation of the Notice of Reasons for Rejection mailed by JPO on Oct. 13, 2009 for Japanese Patent Application No. 2008-192537 (corresponding to U.S. Appl. No. 12/508,269).

(Continued)

*Primary Examiner* — Binh X Tran
(74) *Attorney, Agent, or Firm* — Knobbe Martens Olson & Bear, LLP (57) ABSTRACT

According to one embodiment, a method of manufacturing a magnetic recording medium includes forming a resist on a magnetic recording layer, imprinting a stamper to the resist to transfer patterns of protrusions and recesses, and partially etching the magnetic recording layer in areas not covered with patterns of the resist used as masks by ion beam etching using a mixed gas of He and $N_2$ as well as modifying a remainder of the magnetic recording layer to leave behind a nonmagnetic layer having a reduced thickness.

8 Claims, 3 Drawing Sheets

U.S. PATENT DOCUMENTS

| | | |
|---|---|---|
| 2005/0243467 A1 | 11/2005 | Takai et al. |
| 2005/0284842 A1 | 12/2005 | Okawa et al. |
| 2006/0003551 A1 | 1/2006 | Mancini et al. |
| 2006/0021966 A1 | 2/2006 | Hattori et al. |
| 2006/0124585 A1 | 6/2006 | Suwa et al. |
| 2006/0183004 A1 | 8/2006 | Hattori et al. |
| 2006/0222897 A1 | 10/2006 | Kamata et al. |
| 2006/0222899 A1 | 10/2006 | Sugimura et al. |
| 2007/0059562 A1 | 3/2007 | Hattori et al. |
| 2007/0070547 A1 | 3/2007 | Kamata et al. |
| 2007/0211592 A1 | 9/2007 | Sakurai et al. |
| 2007/0224339 A1 | 9/2007 | Kamata et al. |
| 2007/0263324 A1 | 11/2007 | Allen et al. |
| 2007/0281078 A1 | 12/2007 | Kikitsu et al. |
| 2008/0075845 A1 | 3/2008 | Sonobe et al. |
| 2008/0078739 A1 | 4/2008 | Hibi et al. |
| 2008/0093336 A1 | 4/2008 | Lee et al. |
| 2008/0158718 A1 | 7/2008 | Kobayashi et al. |
| 2008/0174914 A1 | 7/2008 | Takai et al. |
| 2008/0217615 A1 | 9/2008 | Kerber |
| 2009/0023078 A1 | 1/2009 | Gutmann et al. |
| 2009/0305081 A1 | 12/2009 | Dai et al. |
| 2009/0308837 A1 | 12/2009 | Albrecht et al. |
| 2009/0314740 A1* | 12/2009 | Ikemoto et al. ............ 216/22 |
| 2010/0006537 A1 | 1/2010 | Yoshiyuki et al. |
| 2010/0018946 A1 | 1/2010 | Isowaki et al. |
| 2010/0018947 A1 | 1/2010 | Kimura et al. |
| 2010/0047625 A1* | 2/2010 | Kamata et al. ............ 428/800 |
| 2010/0053813 A1 | 3/2010 | Fukushima et al. |
| 2010/0059476 A1 | 3/2010 | Yamamoto et al. |
| 2010/0147791 A1* | 6/2010 | Isowaki et al. ............ 216/22 |
| 2010/0155231 A1* | 6/2010 | Watanabe et al. ....... 204/192.34 |
| 2010/0214694 A1* | 8/2010 | Kimura et al. ............ 360/135 |
| 2010/0214695 A1 | 8/2010 | Isowaki et al. |
| 2010/0215989 A1 | 8/2010 | Isowaki et al. |

FOREIGN PATENT DOCUMENTS

| | | |
|---|---|---|
| JP | 03-040219 A | 2/1991 |
| JP | 05-205257 | 8/1993 |
| JP | 07-87053 | 9/1995 |
| JP | 11-328652 | 11/1999 |
| JP | 2000-286241 | 10/2000 |
| JP | 2002-501300 | 1/2002 |
| JP | 2002-359138 A | 12/2002 |
| JP | 2003-183859 | 7/2003 |
| JP | 2004-164692 | 6/2004 |
| JP | 2005-042143 | 2/2005 |
| JP | 2005-050468 | 2/2005 |
| JP | 2005-056535 | 3/2005 |
| JP | 2005-070650 | 3/2005 |
| JP | 2005-071542 | 3/2005 |
| JP | 2005-317155 | 11/2005 |
| JP | 2006-012332 | 1/2006 |
| JP | 2006-147148 | 6/2006 |
| JP | 2006-196143 | 7/2006 |
| JP | 2007-087053 | 4/2007 |
| JP | 2007-095115 | 4/2007 |
| JP | 2008-065944 | 3/2008 |
| JP | 2008-135092 | 6/2008 |
| JP | 2008-210450 | 9/2008 |
| JP | 2009-076924 | 4/2009 |
| JP | 2009-170007 | 7/2009 |
| JP | 2009-181674 | 8/2009 |
| JP | 2009-301655 | 12/2009 |
| JP | 2010-033636 | 2/2010 |
| WO | WO 99/35657 | 7/1999 |
| WO | WO 2008-069082 | 6/2008 |

OTHER PUBLICATIONS

Translation of the Notice of Reasons for Rejection mailed by JPO on Mar. 9, 2010 for Japanese Patent Application No. 2008-317382 (corresponding to U.S. Appl. No. 12/636,610).

Translation of the Notice of Reasons for Rejection mailed by JPO on Oct. 13, 2010 for Japanese Patent Application No. 2008-192536 (corresponding to U.S. Appl. No. 12/509,261).

Translation of the Notice of Reasons for Rejection mailed by JPO on Feb. 2, 2010 for Japanese Patent Application No. 2008-192536 (corresponding to U.S. Appl. No. 12/509,261).

Translation of the Notice of Reasons for Rejection mailed by JPO on Apr. 20, 2010 for Japanese Patent Application No. 2009-038207 (corresponding to U.S. Appl. No. 12/705,456).

Translation of the Notice of Reasons for Rejection mailed by JPO on Apr. 20, 2010 for Japanese Patent Application No. 2009-038206 (corresponding to U.S. Appl. No. 12/705,490).

Translation of the Notice of Reasons for Rejection mailed by JPO on Apr. 20, 2010 for Japanese Patent Application No. 2009-038208 (corresponding to U.S. Appl. No. 12/705,421).

Explanation of Non-English Language References.

Notice of Reasons for Rejection mailed by Japan Patent Office on Nov. 17, 2009 in the corresponding Japanese patent application No. 2008-213674.

* cited by examiner

METHOD OF MANUFACTURING MAGNETIC RECORDING MEDIUM AND MAGNETIC RECORDING MEDIUM

CROSS-REFERENCE TO RELATED APPLICATIONS

This application is a continuation of U.S. patent application Ser. No. 12/544,606 filed Aug. 20, 2009, which is based upon and claims the benefit of priority from Japanese Patent Application No. 2008-213674, filed Aug. 22, 2008, the entire contents of which are incorporated herein by reference.

BACKGROUND

1. Field

One embodiment of the present invention relates to a method of manufacturing a magnetic recording medium such as a discrete track recording medium and a bit patterned medium and a magnetic recording medium manufactured using the method.

2. Description of the Related Art

Recently, in the magnetic recording medium installed in hard disk drives (HDDs), there is an increasing problem of disturbance of enhancement of track density due to interference between adjacent tracks. In particular, a serious technical subject is reduction of write blurring due to fringe effect of a magnetic field from a write head.

To solve such a problem, a discrete track recording patterned medium (DTR medium) has been proposed in which recording tracks are physically separated from each other. Since the DTR medium can reduce a side-erase phenomenon in writing and a side-read phenomenon in reading, it can increase the track density. Therefore, the DTR medium is promising as a high-density magnetic recording medium.

Also, a bit patterned medium (BPM) has been proposed in which read and write are performed for a single magnetic dot as a single recording cell have been proposed.

When read and write of a medium having a surface on which patterns of protrusions and recessed are formed such as the DTR medium and BPM are performed with a flying head, it is preferable that the medium has a flattened surface. Here, it is desirable to make the magnetic recording layer as thick as at least 15 nm in order to ensure signal outputs. In this case, in order to completely separate adjacent tracks with each other, the magnetic recording layer should be etched over the thickness of 15 nm. On the other hand, a designed flying height of the flying head is approximately 10 nm. In order to ensure a head flying height in this state, it is necessary to reduce the width of recesses on the medium surface or to flatten the medium surface by filling the recesses with a nonmagnetic material. It is very difficult, however, to reduce the width of recesses from limitation of electron beam recorder. If the beam size of the EBR is 20 nm, for example, it is impossible to draw patterns having a size of 20 nm or less. To fill the recesses with a nonmagnetic material brings about high manufacturing cost.

On the other hand, there are studied methods of magnetically deactivating the magnetic recording layer in the areas corresponding to the separating regions between the magnetic patterns. For example, Japanese Patent No. 3886802 discloses a method of forming the separating regions between the magnetic patterns by making the magnetic recording layer reacted with halogen. Jpn. Pat. Appln. KOKAI Publication No. 5-205257 discloses a method of forming the separating regions between the magnetic patterns by implanting nitrogen or oxygen. Jpn. PCT National Publication No. 2002-501300 discloses a method of forming the separating regions between the magnetic patterns by applying He ions to the regions.

Since these methods magnetically deactivate the magnetic recording layer having a flat surface and a large thickness, they need a long period of time to form nonmagnetic separating regions. In the method of Jpn. Pat. Appln. KOKAI Publication No. 5-205257, if modification of the separating regions is insufficient, the separating regions have a relatively high coercivity which makes it impossible to separate the magnetic patterns effectively. In the method of Jpn. PCT National Publication No. 2002-501300, if modification of the separating regions is insufficient, it may cause magnetization reversal in the separating regions which also makes it impossible to separate the magnetic patterns effectively.

Jpn. Pat. Appln. KOKAI Publication No. 2005-42143 discloses a method of manufacturing a magnetic random access memory (MRAM) in which reactive ion etching (RIE) using alcohol is performed to etch the magnetic thin film. However, this method does not modify the magnetic thin film. Thus, when the method is applied to manufacturing of a patterned medium, it is needed to etch the magnetic recording layer over the entire thickness.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to an embodiment of the present invention, there is provided a method of manufacturing a magnetic recording medium, comprising: forming a resist on a magnetic recording layer; imprinting a stamper to the resist to transfer patterns of protrusions and recesses; and partially etching the magnetic recording layer in areas not covered with patterns of the resist used as masks by ion beam etching using a mixed gas of He and N2 as well as modifying a remainder of the magnetic recording layer to leave behind a nonmagnetic layer having a reduced thickness.

According to another embodiment of the present invention, there is provided a method of manufacturing a magnetic recording medium, comprising: forming a resist on a magnetic recording layer; imprinting a stamper to the resist to transfer patterns of protrusions and recesses; and partially etching the magnetic recording layer in areas not covered with patterns of the resist used as masks by ion beam etching using an alcohol gas as well as modifying a remainder of the magnetic recording layer to leave behind a nonmagnetic layer having a reduced thickness.

Figure 1:
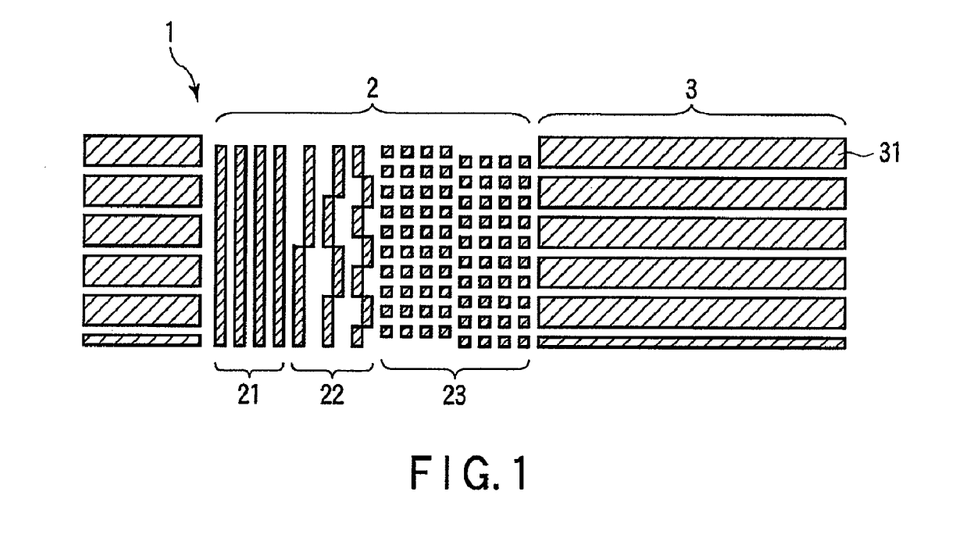
FIG. 1 is a plane view showing a discrete track recording medium.

FIG. 1 shows a plane view of a magnetic recording medium (DTR medium) 1 according to an embodiment of the present invention along the circumferential direction. As shown in FIG. 1, servo zones 2 and data zones 3 are alternately formed along the circumferential direction of the DTR medium 1. The servo zone 2 includes a preamble section 21, address section 22, and burst section 23. The data zone 3 includes discrete tracks 31 separated from each other.

Figure 2:
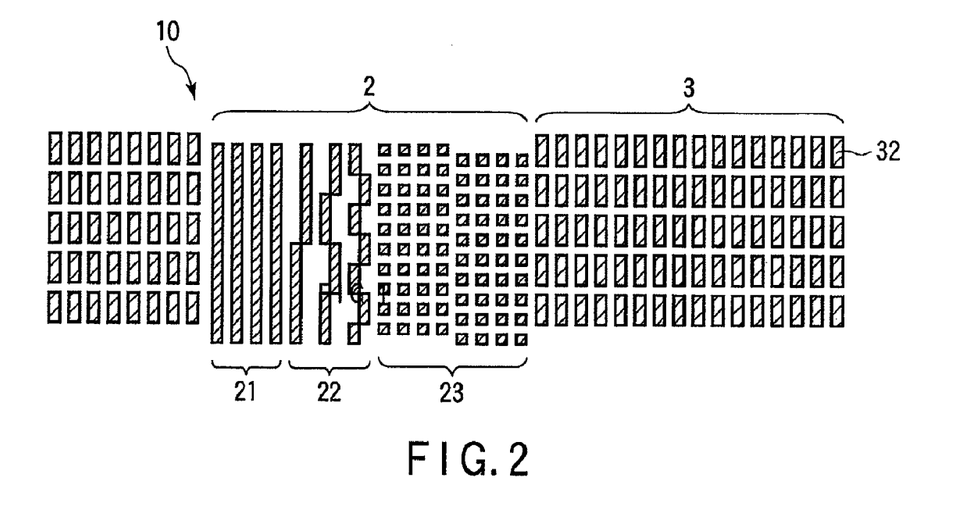
FIG. 2 is a plane view showing a bit patterned medium.

FIG. 2 shows a plane view of a magnetic recording medium (BPM) 1 according to another embodiment of the present invention along the circumferential direction. As shown in FIG. 2, the servo zone 2 has the same configuration as that in FIG. 1. The data zone 3 includes recording bits 32 separated from each other.

As described above, it is desirable that the magnetic recording layer has a thickness of approximately 15 nm in order to ensure signal outputs. In the present invention, the magnetic recording layer having a thickness of approximately 15 nm is etched by approximately 10 nm to form patterns of protrusions and recesses and the remainder of the magnetic recording layer having a thickness of approximately 5 nm in the recesses is magnetically deactivated. The reason why the remainder of the magnetic recording layer in the recesses is magnetically deactivated is that if the magnetic recording layer having a thickness of approximately 5 nm is remained in the recesses recording is performed for the magnetic recording layer in the recesses. In the present invention, a part of the magnetic recording layer corresponding to the separating regions is selectively etched to form patterns of protrusions and recesses having a height or depth of approximately 10 nm and the remainder of the magnetic recording layer in the recesses is magnetically deactivated, thereby manufacturing a magnetic recording medium capable of suppressing the side-erase and side-read phenomena while ensuring flying properties of the read/write head.

Here, it is conceivable to use a method that the magnetic recording layer having a thickness of approximately 15 nm is etched by approximately 10 nm by Ar ion beam etching to form patterns of protrusions and recesses and then the remainder of the magnetic recording layer having a thickness of approximately 5 nm in the recesses is magnetically deactivated by exposing to He ions or $N_2$ ions. However, use of this method brings about following problems.

Figure 3:
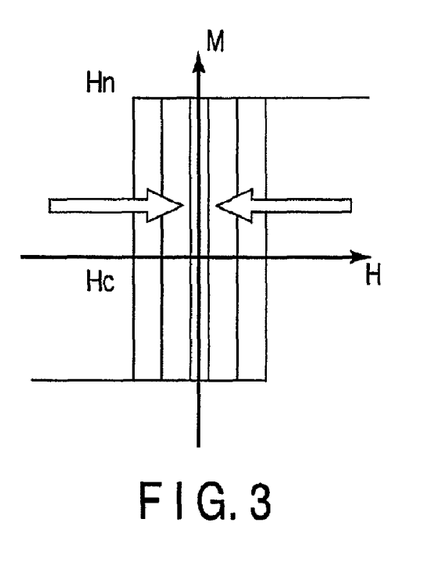
FIG. 3 is a graph showing change in a hysteresis loop when the magnetic recording layer is magnetically deactivated by exposure to He ions.

FIG. 3 shows change in a hysteresis loop when the magnetic recording layer is magnetically deactivated by exposure to He ions. In the case of using the He ions, the magnetic recording layer retains squareness of the hysteresis loop but is reduced in coercivity Hc with the exposure time and loses hysteresis ultimately, which referred to as magnetism deactivation. If the exposure time to the He ions is insufficient, the magnetic recording layer in the recesses retains hysteresis of good squareness, in other words, hysteresis having a reversal nucleating field (Hn). This means a possibility that recording is performed for the separating regions, which eliminates the advantage of the patterned media.

Figure 4:
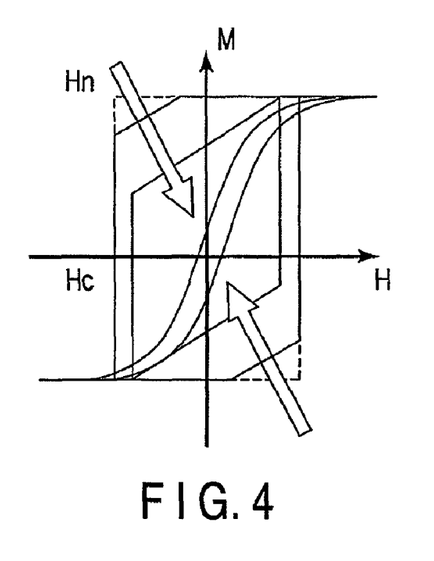
FIG. 4 is a graph showing change in a hysteresis loop when the magnetic recording layer is magnetically deactivated by exposure to $N_2$ ions.

FIG. 4 shows change in a hysteresis loop when the magnetic recording layer is magnetically deactivated by exposure to $N_2$ ions. In the case of using the $N_2$ ions, the magnetic recording layer has degraded squareness of the hysteresis loop with exposure time and loses hysteresis ultimately, which referred to as magnetism deactivation. In this case, the Hn is rapidly degraded but the Hc is hard to be reduced. Thus, if the exposure time to the $N_2$ ions is insufficient, a magnetic material having a high Hc is remained in the separation regions. This means a possibility that recording is performed for the separating regions, which eliminates the advantage of the patterned media.

The present inventors have recognized that behaviors of magnetism deactivation by the He gas and the $N_2$ gas are different from each other, and have developed a method for effectively deactivating the magnetic recording layer remained in the recesses while etching the magnetic recording layer. The present inventors have found that, when a mixed gas of He and $N_2$ is made into a plasma state in vacuum and ionized gas species are accelerated through a acceleration grid to which an acceleration voltage of 300 to 1500 V, preferably 500 to 1000 V to be applied to the magnetic recording layer, for example, the accelerated He and $N_2$ ions perform sputter etching of the magnetic recording layer as well as penetrate into the magnetic recording layer to deactivate magnetism thereof. When the He and $N_2$ ions are used together, both effects of reducing the Hc of the magnetic recording layer by He and of deteriorating the squareness of the hysteresis loop to reduce the Hn of the magnetic recording layer by $N_2$ are provided, which makes it possible to certainly deactivate magnetism of the magnetic recording layer. Further, the $N_2$ gas is heavier then the He gas and has an effect to enhance the etching rate.

The ion beam etching using an alcohol gas such as methanol also makes it possible to effectively deactivate the magnetic recording layer remained in the recesses while etching the magnetic recording layer. Use of the alcohol gas can also reduce both the Hc and Hn of the magnetic recording layer. The alcohol ions can deactivate remained magnetic recording layer while sputter-etching the magnetic recording layer. Specifically, methanol ions implanted into the magnetic recording layer oxidize the magnetic recording layer by which the deactivation advances. Thus, the present invention does not etch the magnetic recording layer through chemical reaction unlike the reactive ion etching (RIE).

It should be noted that when the magnetism of the magnetic recording layer is to be deactivated using a fluorine-containing gas there is a possibility that the remained fluorine reacts with water in the air into hydrofluoric acid (HF) which gradually corrodes the product. Thus, it may desirable that after-treatment such as washing with water is performed to remove the remained fluorine in view of reliability of the product. To the contrary, the method of the present invention performs magnetism deactivation of the magnetic recording layer using the mixed gas of He and $N_2$ or methanol, which dose not have corrosiveness and does not need any aftertreatment. Thus, it is expected that the method of the present invention can achieve reduction in the tact time and cost.

Therefore, the present invention makes it possible to manufacture a magnetic recording medium such as a discrete track recording medium or bit patterned medium having good head positioning accuracy and good SN ratio while ensuring flying properties of the read/write head at a low cost.

A method of manufacturing a magnetic recording medium according to the present invention will be described with reference to FIGS. 5A to 5H.

Figure 5A:
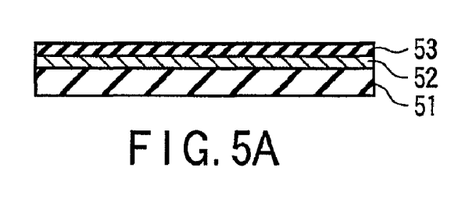
FIGS. 5A to 5H are cross-sectional views showing a method of manufacturing a magnetic recording medium according to an embodiment of the present invention.

As shown in FIG. 5A, on a glass substrate 51, a soft magnetic underlayer (not shown) made of CoZrNb having a thickness of 120 nm, an orientation control underlayer (not shown) made of Ru having a thickness of 20 nm, a magnetic recording layer 52 made of CoCrPt—$SiO_2$ having a thickness of 15 nm, and an etching protecting layer 53 made of carbon having a thickness of 15 nm are sequentially deposited. The soft magnetic underlayer and the orientation control layer are not shown here for simplification.

Figure 5B:
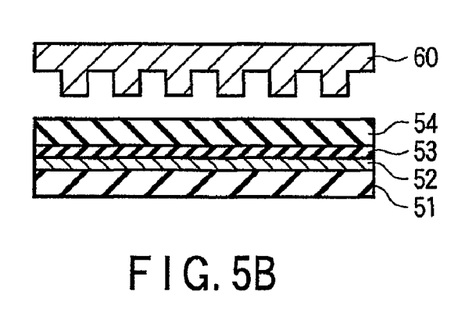

As shown in FIG. 5B, spin-on-glass (SOG) having a thickness of 70 nm is spin-coated as a resist 54 on the etching protecting layer 53. A stamper 60 is arranged to face the resist 54. On the stamper 60, patterns of protrusions and recesses corresponding to those of the magnetic patterns shown in FIG. 1 or 2 are formed.

Figure 5C:
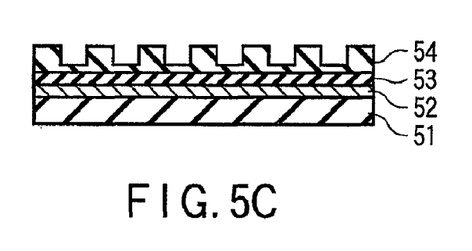

As shown in FIG. 5C, imprinting is performed by using the stamper 60, and protrusions 54a of the resist 54 are formed corresponding to recesses of the stamper 60. After the imprinting, the stamper 60 is removed.

Figure 5D:
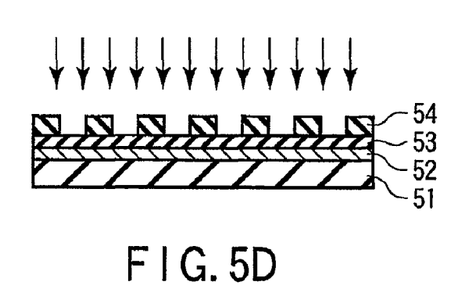

As shown in FIG. 5D, resist residues left behind on bottoms of the recesses of the patterned resist 54 are removed. For example, an ICP (inductive coupling plasma) etching apparatus is used, a $CF_4$ gas is introduced as a process gas, a chamber pressure is set to 2 mTorr, an RF power of a coil and an RF power of a platen are set to 100 W, respectively, and an etching time is set to 30 seconds.

Figure 5E:
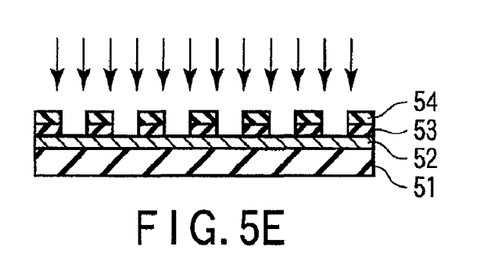

As shown in FIG. 5E, the etching protecting layer 53 is patterned using the resist patterns 54 as masks. For example, the ICP etching apparatus is used, an $O_2$ gas is introduced as a process gas, a chamber pressure is set to 2 mTorr, an RF power of a coil and an RF power of a platen are set to 100 W, respectively, and an etching time is set to 30 seconds.

Figure 5F:
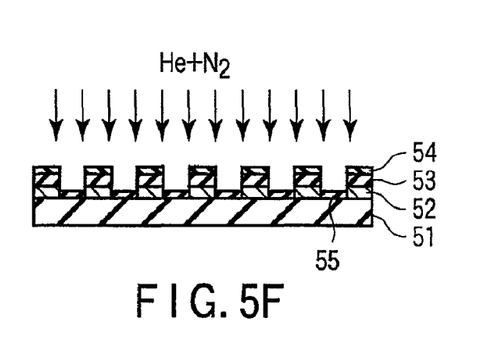

As shown in FIG. 5F, ion beam etching with He+$N_2$ or methanol is performed using the patterns of the etching protecting layer 53 as masks by which the magnetic recording layer 52 is partially etched to form protrusions and recesses as well as the magnetic recording layer 52 remained in the recesses is modified to form a nonmagnetic layer. At this time, it is preferable to use an ECR (electron cyclotron resonance) ion gun. The ECR ion gun has an advantage of ionizing any gas species. For example, etching is performed at a microwave power of 800 W and an acceleration voltage of 700 V for one minute to form recesses having a depth of 10 nm on the magnetic recording layer 52.

It should be noted that the ion beam etching may be performed using a mixed gas of He and $N_2$ and further mixed with Ar.

Figure 5G:
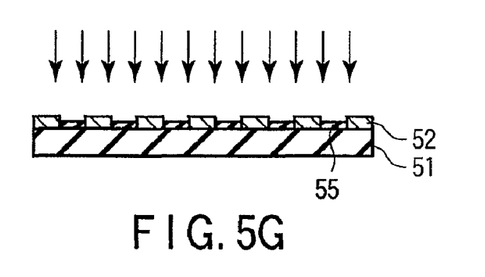

As shown in FIG. 5G, the patterns of the etching protecting layer (carbon) 53 are removed. For example, RIE (Reactive Ion Etching) is performed using an oxygen gas under conditions of 100 mTorr and 100 W. In general, the resist (SOG) remained on the patterns of the etching protecting layer 53 is also lifted off. Alternatively, the remaining SOG may be stripped off by RIE using a $CF_4$ gas, and then carbon is stripped off by RIE using an oxygen gas.

Figure 5H:
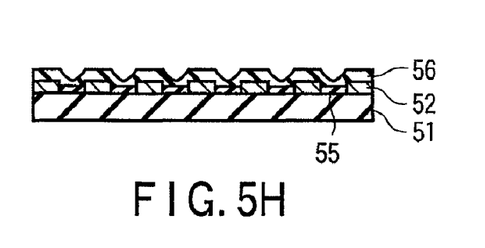

As shown in FIG. 5H, a surface protecting film 56 made of carbon is deposited by CVD (chemical vapor deposition). A lubricant is coated on the surface protecting film 56 to provide a magnetic recording medium according to the present invention.

Next, preferable materials to be used in the embodiments of the present invention will be described.

[Substrate]

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

[Soft Magnetic Underlayer]

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

[Magnetic Recording Layer]

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

[Protective Layer]

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, $SiO_2$ or $ZrO_2$. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

[Imprinting]

A resist is applied to the surface of a substrate by spin-coating and then, a stamper is pressed against the resist to thereby transfer the patterns of the stamper to the resist. As the resist, for example, a general novolak-type photoresist or spin-on-glass (SOG) may be used. The surface of the stamper on which patterns of protrusions and recesses corresponding to servo information and recording tracks are formed is made to face the resist on the substrate. In this process, the stamper, the substrate and a buffer layer are placed on the lower plate of a die set and are sandwiched between the lower plate and the upper plate of the die set to be pressed under a pressure of 2000 bar for 60 seconds, for example. The height of the protrusions of the patterns formed on the resist by imprinting is, for instance, 60 to 70 nm. The above conditions are kept for about 60 seconds for transporting the resist to be excluded. In this case, if a fluorine-containing peeling agent is applied to the stamper, the stamper can be peeled from the resist satisfactorily.

[Removal of Resist Residues]

Resist residues left behind on the bottoms of the recesses of the resist are removed by RIE (reactive ion etching). As the plasma source, ICP (inductively coupled plasma) apparatus capable of producing high-density plasma under a low pressure is preferable, but an ECR (electron cyclotron resonance) plasma or general parallel-plate RIE apparatus may be used. When SOG is used as the resist, fluorine gas RIE is used. When novolac-based photoresist is used as the resist, oxygen RIE is used.

[Stripping of Resist]

After the magnetic recording layer is etched, the resist is stripped off. When a general photoresist is used as the resist, it can be easily stripped off by oxygen plasma treatment. Specifically, the photoresist is stripped off by using an oxygen ashing apparatus under the conditions that the chamber pressure is 1 Torr, power is 400 W and processing time is 5 minutes. When SOG is used as the resist, SOG is stripped off by RIE using fluorine-containing gas. As the fluorine-containing gas, $CF_4$ or $SF_6$ is suitable. Note that, it is preferable to carry out rinsing with water because the fluorine-containing gas reacts with moisture in the atmosphere to produce an acid such as HF and $H_2SO_4$.

[Deposition of Protective Layer and Aftertreatment]

Then, a carbon protective layer is deposited. The carbon protective layer is preferably be deposited by CVD to improve coverage to the irregular surface, but it may be deposited by sputtering or vacuum evaporation. CVD produces a DLC film containing a large amount of $sp^3$-bonded carbon. The carbon protective layer with a thickness less than 2 nm is not preferable because it results in unsatisfactory coverage. Whereas, a carbon protective layer with a thickness exceeding 10 nm is not preferable because it increases magnetic spacing between a read/write head and a medium, leading to a reduction in SNR. A lubricant is applied to the surface of the protective layer. As the lubricant, for example, perfluoropolyether, fluorinated alcohol, fluorinated carboxylic acid or the like is used.

EXAMPLES

Example 1

A DTR medium was manufactured by the method shown in FIGS. 5A to 5H using a stamper on which the patterns of protrusions and recesses corresponding to the servo patterns (preamble, address, and burst) and the recording tracks are formed as shown in FIG. 1.

In the step of FIG. 5F, with an ECR ion gun using a He gas only or a mixed gas of He and $N_2$ as a process gas, the magnetic recording layer 52 having a thickness of 15 nm was ion-bean etched at an acceleration voltage of 700 V to form recesses having a depth of 10 nm as well as the nonmagnetic layer 55 was formed.

In the case of using the He gas only, it took one minute to form the recesses having a depth of 10 nm. The depth distribution on the etched surface was ±5% for the disk of 1.8 inch in diameter.

In the case of using a mixed gas of 75% He and 25% $N_2$ (He:$N_2$=3:1), the ECR plasma was stabilized and the depth distribution on the etched surface was improved to ±3% for the disk of 1.8 inch in diameter.

In the case of using a mixed gas of 50% He and 50% $N_2$ (He:$N_2$=1:1), the etching rate was enhanced and it took only 45 seconds to form the recesses having a depth of 10 nm. The depth distribution on the etched surface was ±3% for the disk of 1.8 inch in diameter.

In the case of using a mixed gas of 25% He and 75% $N_2$ (He:$N_2$=1:3), the etching rate was further enhanced and it took only 30 seconds to form the recesses having a depth of 10 nm.

For each sample, a DLC protecting film was formed and a lubricant was coated so that a DTR medium was manufactured.

When each DTR medium was evaluated for a glide test, each medium passed the glide test using a flying head with a flying height of 8 nm.

When each DTR medium was installed in a drive and measured for on-track BER (bit error rate), the power of −5.0 was obtained. The positioning accuracy of the read/write head was 6 nm.

Also, each medium was evaluated for a fringe test in which recording was performed on a center track and then the BER was measured, and recording was performed on adjacent tracks hundred thousand times, and then the BER of the center track was measured again to examine degradation in BER. As a result, degradation in BER was not observed, showing preferable fringe resistance.

It was found that the DTR medium manufactured by the method of the present invention exhibited good head flying properties, good head positioning accuracy, and high fringe resistance.

In the step of performing ion beam etching using a mixed gas of He and $N_2$ to form recesses on the magnetic recording layer 52 as well as to form nonmagnetic layer 55, if a $N_2$ mixing ratio in the mixed gas is high, the etching rate is enhanced, which is preferable in view of productivity.

Figure 6:
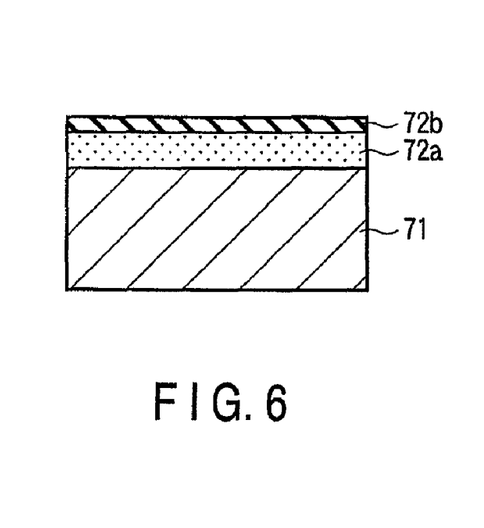
FIG. 6 is a schematic cross-sectional view of a recess in the magnetic recording layer formed in Example 1.

After ion beam etching using a mixed gas of He and $N_2$ as a process gas, a TEM (transparent electron microscope) lattice image of a recess on the magnetic recording layer was photographed. FIG. 6 shows a schematic cross-sectional view of a recess in the magnetic recording layer. As shown in FIG. 6, a high-contrast region having a thickness of approximately 1 nm was observed on the surface of the recess. The surface region 72b is not observed in a DTR medium manufactured by a conventional method. When the surface region 72b was examined by EDX (energy dispersive X-ray analysis) or WDX (wavelength dispersive X-ray analysis), nitrogen was observed. From the results, the main component of the surface region 72b is supposed to be chrome nitride. A region of an amorphous structure in which a lattice was collapsed was observed under the surface region 72b. The amorphous regions 72a is supposed to be formed in such a manner that the magnetic recording layer is penetrated with the He gas and the crystal structure of the ferromagnetic material is broken into the amorphous structure. Under the amorphous region 72a, there is the orientation control underlayer made of Ru.

Comparative Example 1

A DTR medium having recesses with a depth of 10 nm was manufactured in a similar manner to that in Example 1 except that the ion beam etching was performed using Ar in place of the mixed gas of He and $N_2$.

When the resultant DTR medium was evaluated for a glide test, the medium passed the glide test using a flying head with a flying height of 8 nm.

When the resultant DTR medium was installed in a drive and measured for on-track BER, the power of −4.3 was obtained. The positioning accuracy of the read/write head was 6 nm.

When the medium was evaluated for a fringe test, BER in the central track was degraded even if recording was performed on an adjacent track only one time. The cause of the result is that the magnetic recording layer remained in the recesses is not deactivated and the signals in the adjacent track are superposed as noise on those of the central track. When a DTR medium is manufactured by a conventional method, recording is performed for the magnetic recording layer remained in the recesses, which brings about poor fringe resistance and makes it impossible to suppress the side-erase and side-read.

Example 2

In the step of FIG. 5F, with an ECR ion gun using a mixed gas of He and $N_2$ in a various mixing ratio as a process gas, the magnetic recording layer 52 having a thickness of 15 nm was ion-bean etched at an acceleration voltage of 700 V to form recesses as well as the nonmagnetic layer 55 was formed. In this step, the depth of recesses was varied in the range of 5 to 10 nm. A DTR medium was manufactured in a similar manner to that in Example 1 other than the above conditions.

Each DTR medium was installed in a drive and evaluated for a fringe test. Based on the results, the depth of the recessed where good fringe resistance is obtained is estimated. The following results were obtained.

In the case of using a mixed gas of 75% He and 25% $N_2$ (He:$N_2$=3:1), good fringe resistance was obtained where the depth of the recesses was 7 nm or less.

In the case of using a mixed gas of 50% He and 50% $N_2$ (He:$N_2$=1:1), good fringe resistance was obtained where the depth of the recesses was 5 nm or less.

In the case of using a mixed gas of 25% He and 75% $N_2$ (He:$N_2$=1:3), good fringe resistance was obtained where the depth of the recesses was 9 nm or less.

These results reflect whether the magnetic recording layer in the recesses is deactivated in magnetism during the etching time for forming the recesses. In the case of using a mixed gas of 75% He and 25% $N_2$, the deactivation speed of the magnetic recording layer is low and the etching rate is also low, so that the magnetic recording layer in the recesses is deactivated when the recesses of 7 nm in depth is formed. In the case of using a mixed gas of 25% He and 75% $N_2$, the etching rate is too high relative to the deactivation speed of the magnetic recording layer in the recesses, so that the magnetic recording layer in the recesses is deactivated when the recesses of 9 nm in depth is formed. In the case of using a mixed gas of 50% He and 50% $N_2$, the deactivation speed of the magnetic recording layer and the etching rate are well-balanced, so that the magnetic recording layer in the recesses is deactivated when the recesses of 5 nm in depth is formed.

It is desirable, in view of flying characteristics of the read/write head and productivity (or process time), that the recesses have a small depth at the time when the magnetic recording layer in the recesses is deactivated. Therefore, the ion beam etching using the mixed gas of 50% He and 50% $N_2$ is suited for manufacturing a patterned medium.

Example 3

In the step of FIG. 5F, with an ECR ion gun using a methanol gas as a process gas, the magnetic recording layer 52 having a thickness of 15 nm was ion-bean etched at an acceleration voltage of 700 V to form recesses as well as the nonmagnetic layer 55 was formed. A DTR medium was manufactured in a similar manner to that in Example 1 other than the above conditions.

Figure 7:
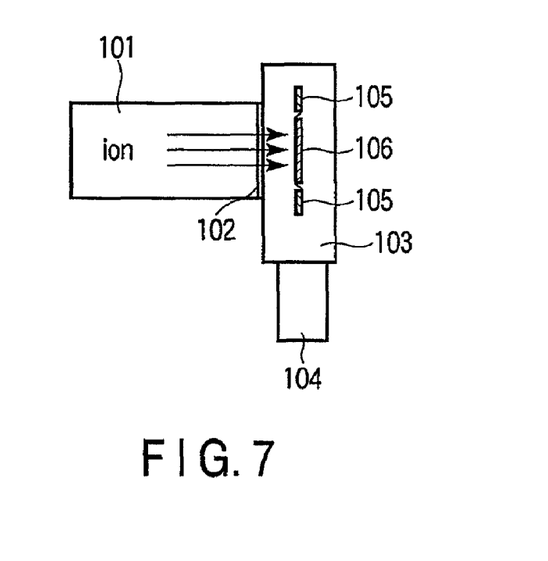
FIG. 7 is a diagram showing a state that a sample is subjected to ion beam etching with an ECR ion gun in Example 3.

FIG. 7 shows a state that a sample is subjected to ion beam etching with an ECR ion gun. An accelerating grid 102 is arranged between an ECR ion source 101 and chamber 102. A sample 106 is held with a carrier 105 in the chamber 103. The chamber 103 is evacuated with a turbo pump 104.

The methanol ions accelerated with the accelerating grid 102 sputter the surface of the sample 106 so as to etch the magnetic recording layer and, at the same time, the methanol ions penetrate into the magnetic recording layer in the recesses which oxidize the magnetic recording layer thereby deactivating magnetism.

In the ECR ion gun, generated active radicals stay in the ECR ion source 101 and do not reach the surface of the sample 106. Thus, etching through chemical reaction does not caused in the ECR ion gun unlike the case of RIE.

Like Example 2, the DTR medium was installed in a drive and evaluated for a fringe test, and the depth of the recessed where good fringe resistance is obtained is estimated. As a result, good fringe resistance was obtained where the depth of the recesses was 3 nm.

Thus, according to the manufacturing method in this Example, it is found that a DTR medium having good flying characteristics of the read/write head can be manufactured with high productivity.

Example 4

In the step of FIG. 5F, with an ECR ion gun using a He gas as a process gas, the magnetic recording layer 52 having a thickness of 15 nm was ion-bean etched at an acceleration voltage of 700 V to form recesses as well as the nonmagnetic layer 55 was formed. A DTR medium was manufactured in a similar manner to that in Example 1 other than the above conditions.

Like Example 2, the DTR medium was installed in a drive and evaluated for a fringe test, and the depth of the recessed where good fringe resistance is obtained is estimated. As a result, good fringe resistance was obtained where the depth of the recesses was 10 nm.

Next, a DTR medium was manufactured in a similar manner to that in the above method except that the deactivation of the magnetic recording layer in the recesses was promoted by exposure to $CF_4$ gas plasma between the step of processing the magnetic recording layer in FIG. 5F and the stripping step in FIG. 5G.

Like Example 2, the DTR medium was installed in a drive and evaluated for a fringe test, and the depth of the recessed where good fringe resistance is obtained is estimated. As a result, good fringe resistance was obtained where the depth of the recesses was 5 nm.

It should be noted that when the stripping step in FIG. 5G is performed in the two stages of the "stripping of the resist (SOG) using $CF_4$ gas" and the "stripping of the protecting layer (carbon) using oxygen gas" the exposure to the $CF_4$ gas plasma can be substituted with the former "stripping of the SOG using $CF_4$ gas". In addition, if the exposure to the $CF_4$ gas plasma needed for the stripping of the SOG is performed in a short time, aftertreatment for removing remained fluorine is not necessarily needed.

Example 5

A BPM was manufactured by the method shown in FIG. 5A to 5H using a stamper on which the patterns of protrusions and recesses of the servo patterns (preamble, address, and burst) and the magnetic dots are formed as shown in FIG. 2.

In the step of FIG. 5F, with an ECR ion gun using a mixed gas of 50% of He and 50% of $N_2$ as a process gas, the magnetic recording layer 52 having a thickness of 15 nm was ion-bean etched at an acceleration voltage of 700 V to form recesses having a depth of 5 nm as well as the nonmagnetic layer 55 was formed. Further, a DLC protecting film was formed and a lubricant was coated so that a BPM was manufactured.

When the resultant BPM was evaluated for a glide test, the medium passed the glide test using a flying head with a flying height of 8 nm.

Since the BER cannot be defined in a BPM, the medium was evaluated for signal amplitude intensity. When the resultant BPM was installed in a drive such that the magnetic recording layer was magnetized in one direction and a read waveform was observed, a signal amplitude intensity of 200 mV was obtained. The positioning accuracy of the read/write head was 6 nm. Thus, using the method of the present invention, it was found that the BPM can also be manufactured.

As described above, the DTR medium or the BPM manufactured by the method according to the present invention can ensure good flying properties of the read/write head and exhibit good head positioning accuracy and a high SN ratio. Furthermore, since a corrosive gas is not used which makes it possible to eliminate aftertreatment such as washing with water, the method of the present invention can manufacture a highly reliable DTR medium or BPM and can achieve high throughput and cost reduction.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, comprising:
   forming a resist on a magnetic recording layer with a first thickness;
   imprinting a stamper to the resist to transfer patterns of protrusions and recesses in order to form patterns of the resist on first areas of the magnetic recording layer; and
   etching a surface portion of the first thickness of the magnetic recording layer and modifying the magnetic recording layer in second areas other than the first areas of the magnetic recording layer by ion beam etching using an alcohol gas in order to form a nonmagnetic layer with a second thickness smaller than the first thickness of the magnetic recording layer in the first areas.

2. The method of claim 1, wherein the alcohol gas is a methanol gas.

3. The method of claim 1, wherein the alcohol gas is ionized by an electron cyclotron resonance ion gun.

4. The method of claim 1, wherein the resist is a photoresist or spin-on-glass.

5. The method of claim 1, further comprising depositing a carbon protective layer over the first areas and the second areas after etching the surface portion of the first thickness of the magnetic recording layer.

6. The method of claim 1, wherein, after the ion beam etching using an alcohol gas is performed, the nonmagnetic layer is further modified using a fluorine-containing gas.

7. The method of claim 6, wherein the fluorine-containing gas is a $CF_4$ gas.

8. The method of claim 6, wherein the fluorine-containing gas is a $SF_6$ gas.

* * * * *